United States Patent
Nair et al.

(10) Patent No.: US 11,379,557 B2
(45) Date of Patent: Jul. 5, 2022

(54) DEVICE AND METHOD FOR FLEXIBLY SUMMING MATRIX VALUES

(71) Applicant: Meta Platforms, Inc., Menlo Park, CA (US)

(72) Inventors: Krishnakumar Narayanan Nair, Newark, CA (US); Thomas Mark Ulrich, Mountain View, CA (US); Ehsan Khish Ardestani Zadeh, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 78 days.

(21) Appl. No.: 16/869,303

(22) Filed: May 7, 2020

(65) Prior Publication Data

US 2021/0349965 A1 Nov. 11, 2021

(51) Int. Cl.
*G06F 17/16* (2006.01)
*G06F 7/78* (2006.01)

(52) U.S. Cl.
CPC .............. *G06F 17/16* (2013.01); *G06F 7/78* (2013.01)

(58) Field of Classification Search
CPC ...... G06F 17/00–156; G06F 7/00–785; G06N 3/00–126
See application file for complete search history.

(56) References Cited

U.S. PATENT DOCUMENTS

2019/0311242 A1* 10/2019 Chen ..................... G06F 17/16
2021/0216873 A1* 7/2021 Liu ........................ G06N 3/063

* cited by examiner

*Primary Examiner* — Emily E Larocque
*Assistant Examiner* — Carlo Waje
(74) *Attorney, Agent, or Firm* — Van Pelt, Yi & James LLP

(57) ABSTRACT

A device includes a matrix transpose component, a matrix processing component, a data alignment component, and a data reduction component. The matrix transpose component is configured to transpose an input matrix of elements to output an output matrix of the elements that have been transposed. The matrix processing component is configured to multiply a first multiplication input matrix with a second multiplication input matrix, wherein the output matrix of the matrix transpose component is utilized as the first multiplication input matrix and a mask vector is utilized as the second multiplication input matrix. The data alignment component is configured to modify at least a portion of elements of a result of the matrix processing component. The data reduction component is configured to sum at least the elements of the modified result of the matrix processing component to determine a sum of the group of values.

20 Claims, 7 Drawing Sheets

| $A_{00,3}$ $A_{00,2}$ $A_{00,1}$ $A_{00,0}$ $A_{01,3}$ $A_{01,2}$ $A_{01,1}$ $A_{01,0}$ $A_{02,3}$ $A_{02,2}$ $A_{02,1}$ $A_{02,0}$ $A_{03,3}$ $A_{03,2}$ $A_{03,1}$ $A_{03,0}$ | $A_{10,3}$ $A_{10,2}$ $A_{10,1}$ $A_{10,0}$ $A_{11,3}$ $A_{11,2}$ $A_{11,1}$ $A_{11,0}$ $A_{12,3}$ $A_{12,2}$ $A_{12,1}$ $A_{12,0}$ $A_{13,3}$ $A_{13,2}$ $A_{13,1}$ $A_{13,0}$ | $A_{20,3}$ $A_{20,2}$ $A_{20,1}$ $A_{20,0}$ $A_{21,3}$ $A_{21,2}$ $A_{21,1}$ $A_{21,0}$ $A_{22,3}$ $A_{22,2}$ $A_{22,1}$ $A_{22,0}$ $A_{23,3}$ $A_{23,2}$ $A_{23,1}$ $A_{23,0}$ | $A_{30,3}$ $A_{30,2}$ $A_{30,1}$ $A_{30,0}$ $A_{31,3}$ $A_{31,2}$ $A_{31,1}$ $A_{31,0}$ $A_{32,3}$ $A_{32,2}$ $A_{32,1}$ $A_{32,0}$ $A_{33,3}$ $A_{33,2}$ $A_{33,1}$ $A_{33,0}$ |
|---|---|---|---|

DEVICE AND METHOD FOR FLEXIBLY SUMMING MATRIX VALUES

BACKGROUND OF THE INVENTION

A whole class of complex artificial intelligence problems can be solved using neural networks. Common operations required by many neural networks include summations, multiplications, and dot products, for example, when performing matrix operations. Since artificial intelligence problems are often computationally and data intensive, hardware solutions are often beneficial for improving performance. It is a technical challenge to create a hardware platform that is flexible and computationally efficient. Therefore, there exists a need for techniques directed toward efficient, high throughput hardware schemes that do not introduce significant hardware complexity and expense.

BRIEF DESCRIPTION OF THE DRAWINGS

Various embodiments of the invention are disclosed in the following detailed description and the accompanying drawings.

FIGS. 4A-4C are diagrams illustrating data processing associated with summing groups of numbers using a matrix transpose component and a low-bit-width matrix processing component.

DETAILED DESCRIPTION

Figure 1:
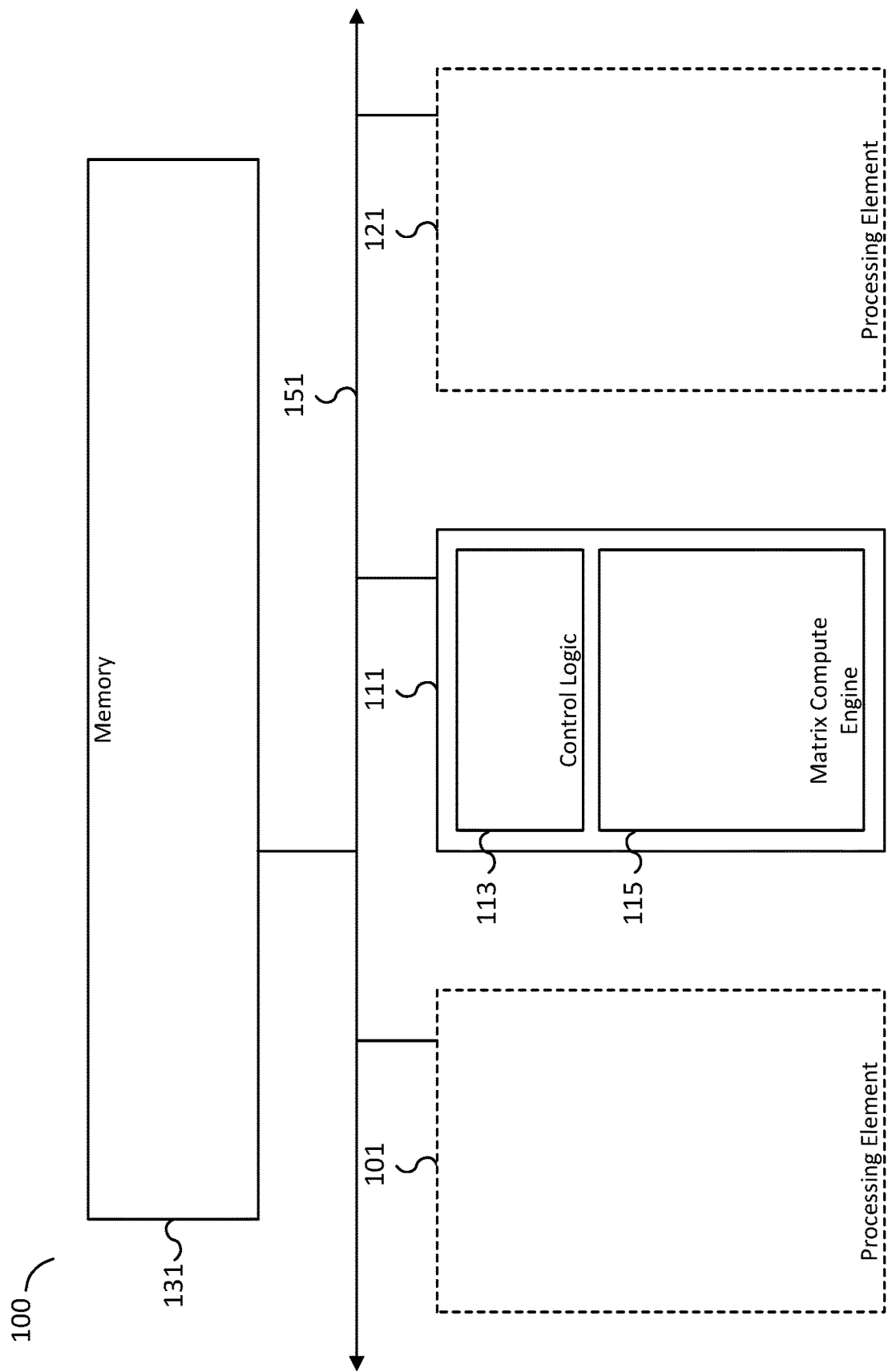
FIG. 1 is a block diagram illustrating an embodiment of a system for solving artificial intelligence problems and other computational problems.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A device (e.g., an application-specific integrated circuit chip) configured to improve the efficiency of numerical processing in hardware is disclosed. The disclosed device includes various components (e.g., integrated circuit components): a matrix transpose component, a matrix processing component, a data alignment component, and a data reduction component. The matrix transpose component is configured to transpose an input matrix of elements to output an output matrix of the elements that have been transposed, where: each element of the input matrix of elements is represented using a first number of bits, each value of a group of values stored in the input matrix is represented using a second number of bits greater than the first number of bits, and each value of the group of values is stored as split segments across more than one element of the elements of the input matrix. The matrix processing component is configured to multiply a first multiplication input matrix with a second multiplication input matrix, wherein the output matrix of the matrix transpose component is utilized as the first multiplication input matrix and a mask vector is utilized as the second multiplication input matrix. The data alignment component is configured to modify at least a portion of elements of a result of the matrix processing component. The data reduction component is configured to sum at least the elements of the modified result of the matrix processing component to determine a sum of the group of values. A practical and technological benefit of the disclosed device is increased flexibility with respect to numerical processing, e.g., the ability to sum high-bit-width numbers using a low-bit-width matrix processing component. For example, a dot product engine that can natively process numbers in a low-bit-width format (e.g., 8-bit integers) may be used to process numbers of a higher bit width (e.g., 32-bit integers). This flexibility conserves hardware resources. Multiple hardware designs would not need to be implemented to handle multiple data formats.

In some embodiments, values (e.g., all values) in a matrix of 32-bit integers are summed to a single scalar quantity using an application-specific integrated circuit device that includes a matrix transpose component, a matrix multiplication component that can natively handle 8-bit integers, a plurality of bit shifters, and an adder unit. In some embodiments, the matrix multiplication component is a plurality of dot product components. Multiplying a matrix can be decomposed into a set of dot products of the rows of the matrix with a specified vector. Applications of summing matrix values to a single scalar quantity include neural network computations (e.g., applying a Softmax function) and other computational problems. As described in further detail herein, in various embodiments, an input matrix is transposed by the matrix transpose component and rows of the transposed matrix are vector multiplied with a mask vector of ones to obtain a vector result whose elements are then bit-shifted specified amounts and summed.

FIG. 1 is a block diagram illustrating an embodiment of a system for solving artificial intelligence problems and other computational problems. For example, system 100 may be applied to use a neural network to solve problems such as image recognition and recommendation system matches. In the example shown, system 100 includes multiple processing elements such as processing elements 101, 111, and 121 connected to memory unit 131 via bus 151. System 100 may include fewer or more processing elements. For example, the number of processing elements can be scaled up or down depending on the intended computational and data requirements. In some embodiments, the processing elements, such as 101, 111, and 121, are communicatively connected to one another and/or memory unit 131 via bus 151. For example, the memory unit may be a last level cache (LLC) and/or may be implemented using static random-access memory (SRAM). Each processing element may be utilized by system 100 to perform matrix compute operations such as summations, multiplications, dot products, matrix multiplications, etc., including integer and floating-point operations. In some embodiments, different processing elements are used for different operations and/or data formats. For example, some processing elements may be used to calculate integer dot products and other processing elements used to calculate floating-point dot products.

In some embodiments, a communication bus, such as bus 151, is used to transmit processing element instructions and optional instruction arguments. For example, a matrix operation and matrix operands may be transmitted to a processing element, such as processing elements 101, 111, and/or 121, via bus 151. Additional processing element instructions may include summation, multiplication, dot product, matrix multiplication, etc. operation instructions, such as integer or floating-point operation instructions. In various embodiments, a large, complex artificial intelligence problem can be solved using system 100 by subdividing the problem into smaller sub-problems. The smaller sub-problems can be assigned and distributed to different processing elements. The results of the smaller sub-problems can be merged to determine the solution to the larger and more complex problem. In some scenarios, the sub-problems are solved in parallel and/or in pipelined stages. In some scenarios, the result from a first processing element is fed as an input to a second processing element.

In some embodiments, each processing element of system 100 includes at least a control logic unit and a matrix compute engine. As shown with respect to processing element 111, processing element 111 includes control logic 113 and matrix compute engine 115. Processing elements 101 and 121 are shown as dotted boxes and some details of processing elements 101 and 121 are not shown. In some embodiments, the control logic unit of a processing element is used to control the operation of the processing element, including the operation of the processing element's matrix compute engine. In the example shown, control logic 113 processes instructions directed to processing element 111 via communication bus 151. For example, a processing element instruction may include an integer or floating-point operation instruction. In some embodiments, control logic 113 determines how to perform the integer or floating-point operation using matrix compute engine 115, including how to determine components of integer or floating-point number operands. In some embodiments, control logic 113 receives processing element instructions via bus 151 and can be used to initiate retrieving and/or writing data from/to memory 131.

In some embodiments, matrix compute engine 115 is a hardware matrix compute engine for performing matrix operations including operations related to integer or floating-point summation, multiplication, dot product, matrix multiplication, and/or convolution operations. For example, matrix compute engine 115 may be a matrix engine for performing dot product operations requiring integer multiplication and addition operations. In some embodiments, the convolution operations supported include depth-wise, groupwise, normal, regular, pointwise, two-dimensional, and/or three-dimensional convolutions, among others. For example, matrix compute engine 115 may receive a first input matrix such as a subset of a large image and a second input matrix such as a filter, kernel, or convolution matrix, etc. to apply to the first input matrix. Matrix compute engine 115 can be used to perform a convolution operation using the two input matrices to determine a resulting output matrix. In some embodiments, matrix compute engine 115 includes input and/or output buffers for loading input data matrices or vectors and writing out a result data matrix or vector. In some embodiments, matrix compute engine 115 includes multiple vector units and each vector unit includes a vector multiply unit and a vector adder unit.

Figure 2:
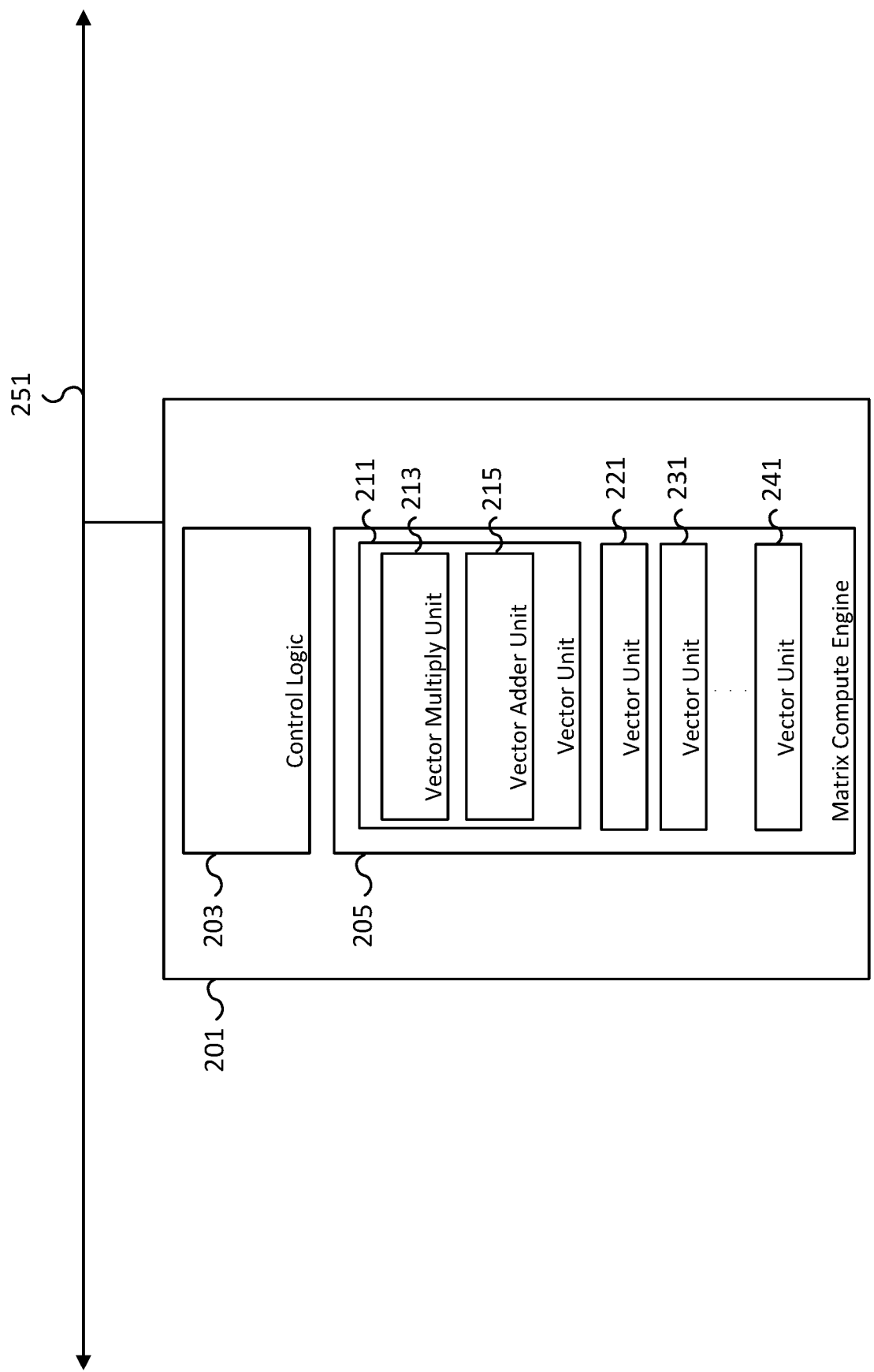
FIG. 2 is a block diagram illustrating an embodiment of a processing element for solving artificial intelligence problems and other computational problems.

FIG. 2 is a block diagram illustrating an embodiment of a processing element for solving artificial intelligence problems and other computational problems. In the example shown, processing element 201 is communicatively connected to bus 251. Processing element 201 includes control logic 203 and matrix compute engine 205. Matrix compute engine 205 includes vector units 211, 221, 231, and 241. Matrix compute engine 205 may include more or fewer vector units. For example, a matrix compute engine may include 32 vector units, each capable of processing two 256-bit vectors. In various embodiments, each vector unit includes a vector multiply unit and a vector adder unit. In the example shown, vector unit 211 includes vector multiply unit 213 and vector adder unit 215. For simplicity, the vector multiply and vector adder units of vector units 221, 231, and 241 are not shown but function similarly to vector multiply unit 213 and vector adder unit 215. In some embodiments, different vector units are used for different operations and/or data formats. For example, some vector units may be used to calculate integer dot products and other vector units used to calculate floating-point dot products. It is also possible for all vector units in a processing element to be used for the same operation and/or data format. In some embodiments, processing element 201 is processing element 101, 111, and/or 121 of FIG. 1. In some embodiments, control logic 203 and matrix compute engine 205 are, respectively, control logic 113 and matrix compute engine 115 of FIG. 1.

In some embodiments, matrix compute engine 205 receives input matrix (or vector) operands to perform matrix operations. For example, matrix compute engine 205 may receive one or more data input vectors corresponding to a portion of an image and at least one weight input vector corresponding to a filter matrix. The input vectors, such as input data and weight vectors, may be passed as arguments to a vector unit, such as one of vector units 211, 221, 231, and 241, of matrix compute engine 205. For example, a vector unit of matrix compute engine 205 may determine a matrix result, such as a dot product result, using a data input vector and weight input vector pair. In some embodiments, matrix compute engine 205 includes 32 vector units. Each vector unit may take two n-element vectors as arguments and determine an n-element vector result. In some embodiments, the result is an output vector result. In some embodiments, output results are determined by accumulating partial vector results across multiple vector unit operations. For example, a multiplication operation can be decomposed into multiple multiplication operations and the results summed.

The number of vector units of matrix compute engine 205 can vary as can the vector unit lengths and element sizes. Depending on the capabilities of the vector unit, different element sizes can be natively supported. In some embodiments, 8-bit integer formats are natively supported.

In some embodiments, each vector unit of matrix compute engine 205, such as vector units 211, 221, 231, or 241, receives two vector operands and performs one or more vector operations. For example, a vector unit can compute the result of multiple multiply operations by multiplying each element of the first input vector with a corresponding element of a second input vector. The resulting multiplication results can be accumulated and used for future operations, such as summing partial results. For example, a vector unit result can be accumulated and used as an operand to a subsequent operation performed by the vector unit.

In some embodiments, each vector unit of matrix compute engine 205, such as vector units 211, 221, 231, or 241, includes a vector multiply unit and a vector adder unit. Each vector multiply unit, such as vector multiply unit 213, is configured to multiply corresponding elements received via input vector operands. In some embodiments, the result is a vector of multiplication results. The first element from a first input vector is multiplied with the first element of a second input vector. Similarly, the second element from the first input vector is multiplied with the second element of the second input vector. In various embodiments, the vector of multiplication results is passed to a vector adder unit of the vector unit. For example, vector multiply unit 213 can pass its multiplication results to vector adder unit 215. Vector adder unit 215 can be used for addition operations such as summing partial results, computing at least in part a dot product result, or other appropriate functionality. For example, a dot product can be calculated by using vector adder unit 215 to sum all the elements of the output of vector multiply unit 213.

In some embodiments, each vector adder unit of a vector unit, such as vector adder unit 215, is configured to compute addition operations using elements from an input vector. For example, the sum of selected elements from a vector of multiplication results computed by vector multiply unit 213 can be computed by vector adder unit 215. In some embodiments, the result of a vector adder unit is a dot product of the vectors used as inputs to the corresponding vector multiply unit. In various embodiments, each vector adder unit, such as vector adder unit 215, is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In some embodiments, specified partial sums may be outputted as a result of the adder unit. In some embodiments, each adder tree computes partial sums in parallel to arrive at a result sum. The parallel operation significantly improves the efficiency of summing a vector of numbers. In some embodiments, each adder tree includes a plurality of binary adders, at least one register, and data routing paths. Multiple vector units can operate in parallel to compute multiple results in parallel, significantly improving the throughput of matrix compute engine 205.

In some embodiments, matrix compute engine 205 includes one or more accumulators (e.g., implemented as registers), for example, to accumulate the results of each vector unit. In some embodiments, an accumulator is included as part of a vector unit or as part of matrix compute engine 205 as appropriate. Accumulators may also be separate from but communicatively connected to matrix compute engine 205. In some embodiments, the accumulator is a vector accumulator. For example, the accumulator may be sized based on the size of an output vector of matrix compute engine 205. The accumulator may also be used to store and add a single element result across multiple iterations. In various embodiments, once matrix processing is complete, the accumulator results are pushed to memory via bus 251.

Figure 3:
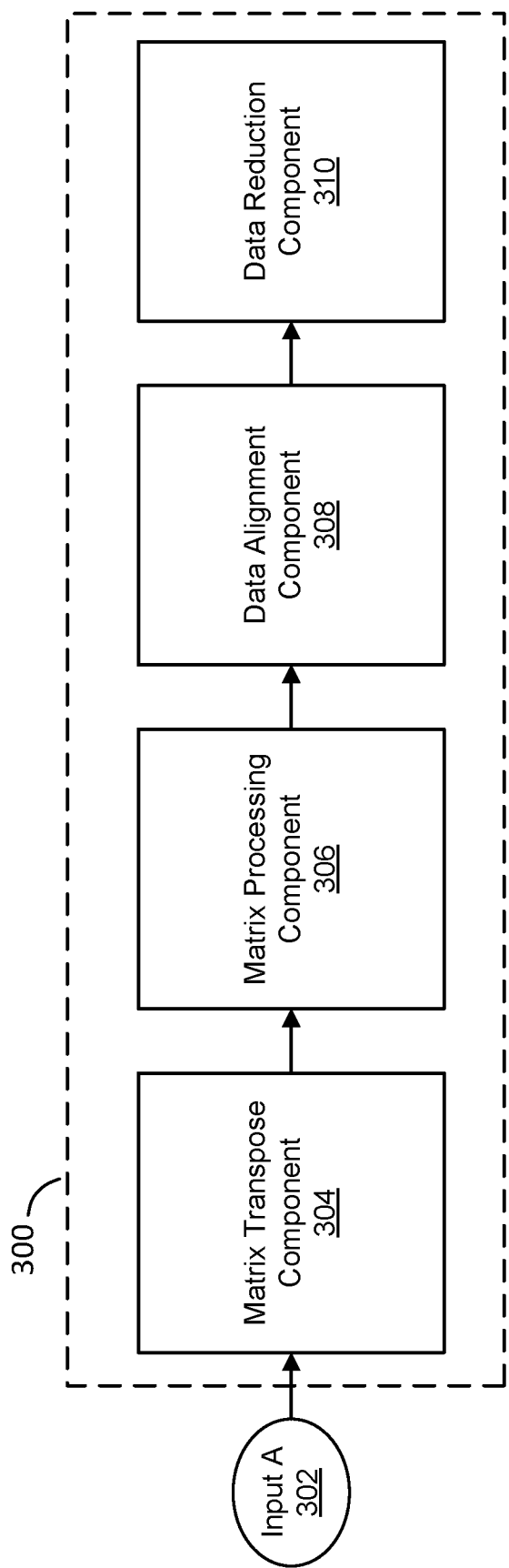
FIG. 3 is a block diagram illustrating an embodiment of a system for summing groups of numbers using a matrix transpose component and a low-bit-width matrix processing component.

FIG. 3 is a block diagram illustrating an embodiment of a system for summing groups of numbers using a matrix transpose component and a low-bit-width matrix processing component. In various embodiments, system 300 is an application-specific integrated circuit (ASIC) device or part of an ASIC device. In the example shown, system 300 includes matrix transpose component 304, matrix processing component 306, data alignment component 308, and data reduction component 310.

In the example shown, system 300 receives input A 302. In some embodiments, input A 302 is a matrix of integers to be summed, wherein the integers have a higher bit width than what matrix processing component 306 is configured to natively handle. For example, input A 302 may be a matrix of 32-bit integers (e.g., int32 format) while matrix processing component 306 is configured to natively handle 8-bit integers (e.g., int8 format). In various embodiments, a group of high-bit-width values stored in input A 302 (e.g., a matrix of 32-bit integers or a part thereof) is summed using a technique that includes transposing input A 302 and performing a matrix multiplication.

Figure 4A:
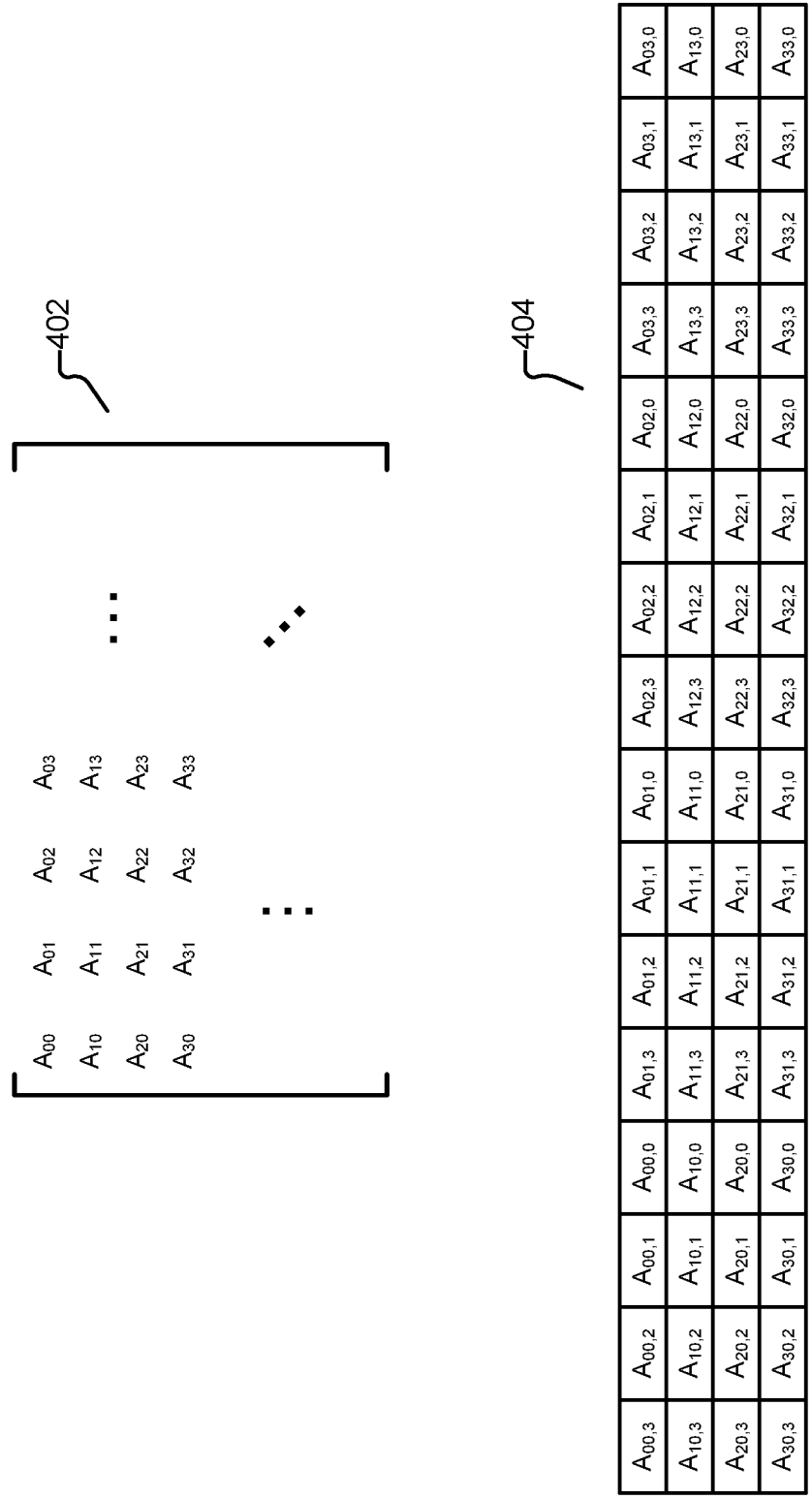

In the example shown, matrix transpose component 304 receives input A 302. In various embodiments, matrix transpose component 304 represents data received as elements of the same low-bit-width format as matrix processing component 306. For example, matrix transpose component 304 may receive 32-bit integer data and represent each 32-bit integer as four 8-bit integer components. Referring to FIG. 4A, matrix 402 of FIG. 4A is an example of a matrix of integers that may be received by matrix transpose component 304. In some embodiments, matrix 402 includes 32-bit integers that, at least a portion of which, are received by matrix transpose component 304 and stored in 8-bit chunks as shown in layout 404 of FIG. 4A. In layout 404, which shows storage of the values shown in matrix 402, each value shown in matrix 402 is stored as split segments across four elements. Each value of matrix 402 is a 32-bit integer, meaning that it is stored as four 8-bit integers in layout 404. For example, the first value in matrix 402 $A_{00}$ is stored as elements $A_{00,3}$, $A_{00,2}$, $A_{00,1}$, and $A_{00,0}$, corresponding to the most significant 8 bits, second most significant 8 bits, second least significant 8 bits, and least significant 8 bits of value $A_{00}$, respectively. The other 32-bit values shown in matrix 402 are also each represented as four 8-bit elements.

In the example of layout 404, split segments for each value of matrix 402 occupy the same row. Similar bit position groups (groups of most significant 8 bits, second most significant 8 bits, second least significant 8 bits, or least significant 8 bits) occupy the same column. For example, $A_{00,3}$, $A_{00,2}$, $A_{00,1}$, and $A_{00,0}$ representing $A_{00}$ are stored in the first row of layout 404 and $A_{00,3}$, $A_{10,3}$, $A_{20,3}$, and $A_{30,3}$ representing the most significant 8 bits of values $A_{00}$, $A_{10}$, $A_{20}$, and $A_{30}$, respectively, are stored in the first column of layout 404. As described in further detail below, for bit shifting purposes, it can be computationally beneficial to store similar bit position groups in the same row instead of the same column. To store the similar bit position groups in the same row instead of column, in various embodiments, layout 404 is matrix transposed using matrix transpose component 304. After matrix transposition, the elements shown in layout 404 of FIG. 4A have the arrangement shown in layout 406 of FIG. 4B. As shown in layout 406, the row and column position of each element of layout 404 has been swapped. For example, $A_{00,0}$ in row 1, column 4 of layout 404 is in row 4, column 1 of layout 406. Furthermore, each row of layout 406 stores one type of bit position element, either most significant 8-bit elements (subscript 3), second most significant 8-bit elements (subscript 2), second least significant 8-bit elements (subscript 1), or least significant 8-bit elements (subscript 0). Matrix transpose component 304 can be implemented in hardware (e.g., an ASIC implementation) using various techniques known by those skilled in the art. For example, elements arranged in layout 404 may be transferred to buffer storage and copied back as arranged in layout 406. Stated alternatively, the contents of input A 302 can be copied into memory in a different order. In some embodiments, in-place matrix transposition techniques are used to conserve memory space usage.

Figure 4C:
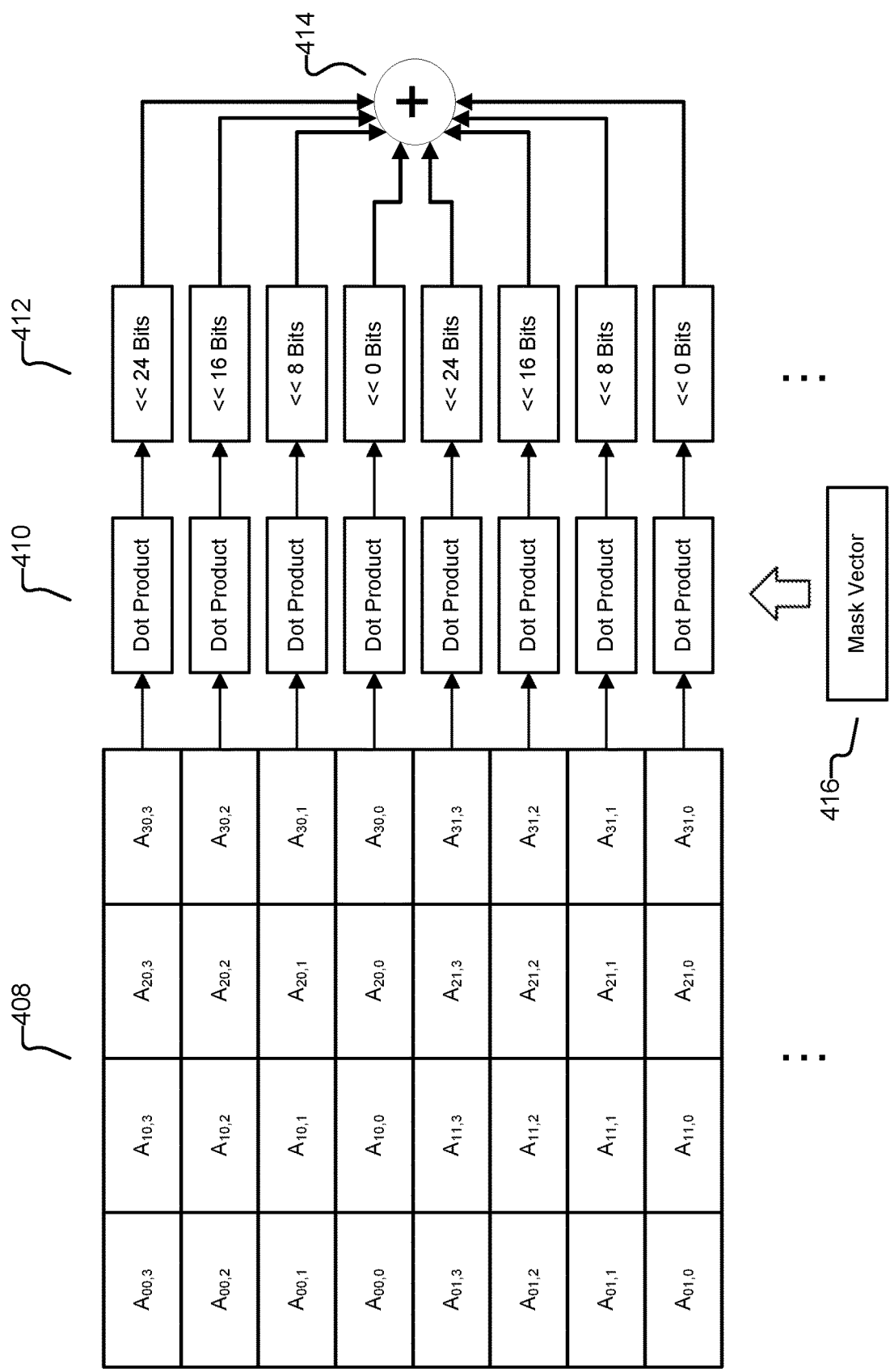

In various embodiments, the output of matrix component 304 is a matrix transposed version of input A 302 and is received by matrix processing component 306. As mentioned above, layout 406 of FIG. 4B shows an example transposed matrix portion. Layout 406 of FIG. 4B is the transpose of layout 404 of FIG. 4A. In various embodiments, matrix processing component 306 multiplies the transposed matrix portion by a same-sized matrix of ones in 8-bit format to determine a sum of the values in the transposed matrix portion. In some embodiments, matrix processing component 306 is processing element 101, 111, or 121 of FIG. 1 or processing element 201 of FIG. 2. Matrix compute engine 115 of FIG. 1 or matrix compute engine 205 of FIG. 2 may perform the actual matrix multiplication. In some embodiments, matrix multiplication is implemented as a plurality of dot products, wherein a dot product operation between each row of the transposed matrix portion with a vector of ones is performed. The vector of ones may be broadcasted to each row of the transposed matrix portion. FIG. 4C illustrates an example of this matrix multiplication. Matrix portion 408 of FIG. 4C shows the first eight rows of the transposed matrix portion of layout 406 of FIG. 4B. Each row of matrix portion 408 is sent to a dot product processing component (of a plurality of dot product processing components 410 of FIG. 4C) to be summed by computing a dot product between the row and a same-sized mask vector 416 of ones. In some embodiments, each dot product processing component of the plurality of dot product processing components 410 is vector unit 211, 221, 231, or 241 of matrix compute engine 205 of FIG. 2. For example, a row of matrix portion 408 can be summed by using vector multiply unit 213 of FIG. 2 to multiply the row with a vector of ones and using vector adder unit 215 of FIG. 2 to sum the elements in the resulting output vector to a scalar quantity. In various embodiments, the elements in matrix portion 408 are 8-bit integers and the dot product processing components are configured to natively handle 8-bit integers.

In various embodiments, the output of matrix processing component 306 is a vector that is sent to data alignment component 308. In some embodiments, data alignment component 308 includes a plurality of bit shifters. In various embodiments, these bit shifters perform specified leftward bit shifts on the elements in the vector that is received by data alignment component 308. Each value in the vector received by data alignment component 308 is a sum of a row of 8-bit elements. For example, data alignment component 308 can receive the outputs of the plurality of dot product processing components 410 of FIG. 4C. As shown in matrix portion 408 of FIG. 4C, each row that is summed has elements with similar bit positions. For example, the first row in matrix portion 408 has elements that are all most significant 8-bit elements. The sum of these elements needs to be bit-shifted leftward by 24 bits to account for the elements' most significant bits positions within corresponding 32-bit integer values of which they are components. The second row in matrix portion 408 has elements that are all second most significant 8-bit elements, meaning a sum of such elements needs to be bit-shifted leftward by 16 bits. For similar reasons, the sum of the third row in matrix portion 408 needs to be bit-shifted leftward by 8 bits, the sum of the fourth row in matrix portion 408 does not need to be bit-shifted (bit shift of 0 bits), the sum of the fifth row in matrix portion 408 needs to be bit-shifted leftward by 24 bits, and so forth. In the example shown in FIG. 4C, a plurality of bit shifters 412 receives the row sums and performs the bit shifts shown in FIG. 4C.

In various embodiments, the output of data alignment component 308 is a vector of data-aligned elements. For example, in some embodiments, the vector includes bit-shifted outputs of a plurality of dot product processing components as illustrated in FIG. 4C. In various embodiments, a vector of bit-shifted outputs is sent to data reduction component 310. In some embodiments, data reduction component 310 is an adder that sums the bit-shifted elements of the vector output of data alignment component 308 to determine a sum of a group of values received by system 300 (e.g., values included in input A 302). The adder may be implemented as an adder tree. In some embodiments, the adder tree includes a plurality of binary adders, at least one register, and data routing paths. Adder 414 of FIG. 4C is an example of an adder receiving bit-shifted outputs from dot product processing components.

In the example illustrated in FIG. 3, portions of the communication path between the components are shown. Other communication paths may exist, and the example of FIG. 3 has been simplified to illustrate the example clearly. For example, control signals and control logic are not shown explicitly in FIG. 3. Furthermore, storage elements and memory are not shown. Although single instances of components have been shown to simplify the diagram, additional instances of any of the components shown in FIG. 3 may exist. The number of components and the connections shown in FIG. 3 are merely illustrative. Components not shown in FIG. 3 may also exist.

The examples described herein are merely illustrative. It is also possible to apply the techniques described herein to sum matrices of numbers of different bit widths and/or in different formats. For example, as would be readily apparent to one skilled in the art, applying the techniques described herein to sum matrices of 64-bit integers can include performing processing on eight chunks of 8 bits instead of four chunks of 8 bits. Different matrix processing components can also be accommodated. For example, summing matrices of 64-bit integers using a matrix processing component configured to natively handle 16-bit integers can include performing processing on four chunks of 16 bits.

FIGS. 4A-4C are diagrams illustrating data processing associated with summing groups of numbers using a matrix transpose component and a low-bit-width matrix processing component. Further description of FIGS. 4A-4C is provided above in the description associated with FIG. 3.

Figure 5:
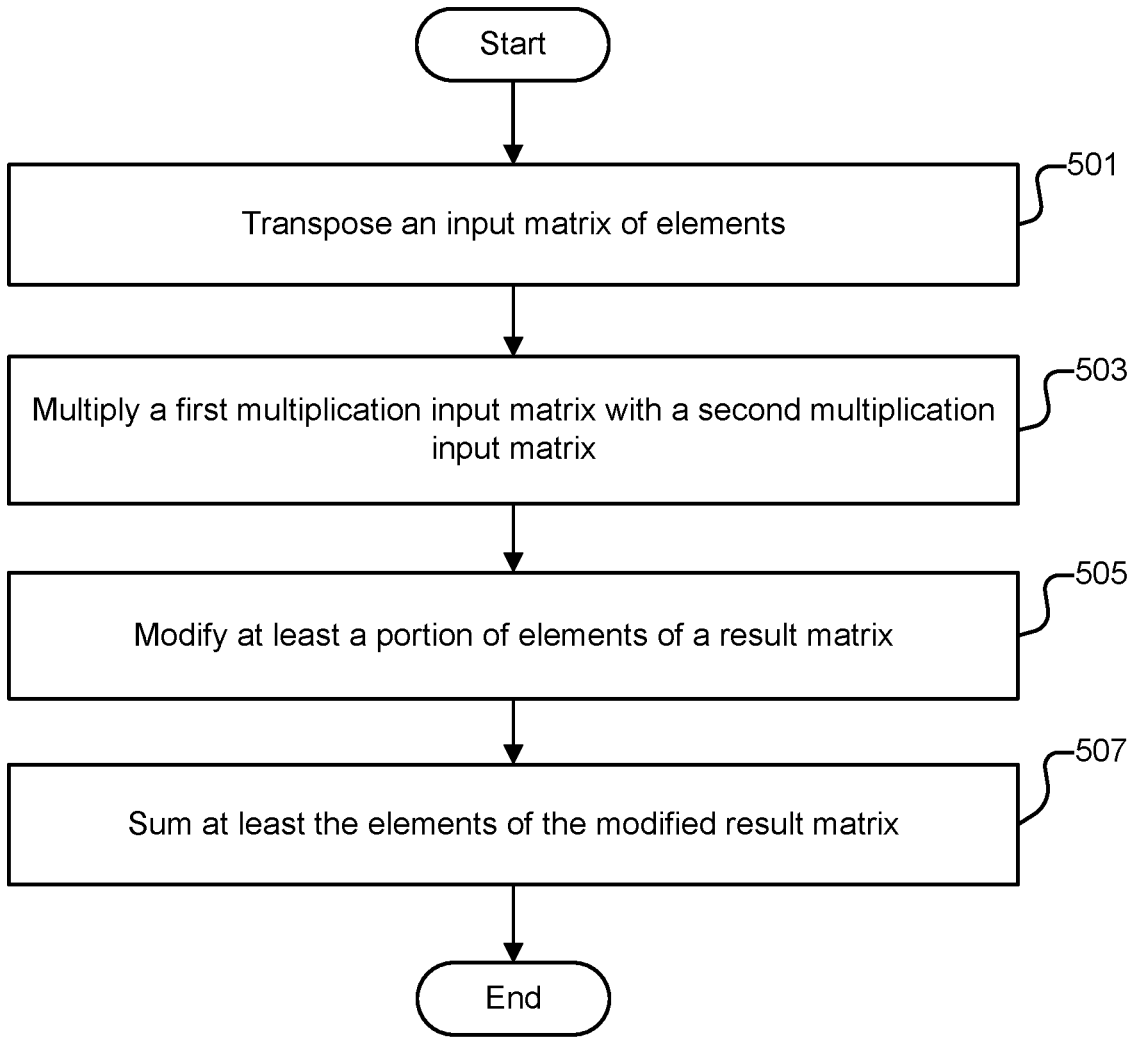
FIG. 5 is a flow chart illustrating an embodiment of a process for summing groups of numbers using a matrix transpose component and a low-bit-width matrix processing component.

FIG. 5 is a flow chart illustrating an embodiment of a process for summing groups of numbers using a matrix transpose component and a low-bit-width matrix processing component. In some embodiments, the process of FIG. 5 is performed by system 300 of FIG. 3.

At 501, an input matrix of elements is transposed. In some embodiments, the matrix transpose is performed by matrix transpose unit 304 of FIG. 3. In various embodiments, each element of the input matrix of elements is represented using a first number of bits (e.g., 8 bits) that is less than a number of bits used to represent values stored in the input matrix (e.g., 32 bits). Stated alternatively, in some embodiments, the input matrix stores higher-bit-width elements (e.g., 32-bit numbers) that are split across multiple lower-bit-width segments (e.g., 32-bit numbers stored as four 8-bit components). An advantage of storing higher-bit-width numbers as split segments across more than one element of the elements of the input matrix is that a lower-bit-width matrix processing component can be used to sum the 32-bit numbers. This provides flexibility in terms of allowing lower-bit-width hardware to be used to process higher-bit-width numbers. In various embodiments, the matrix transpose is performed on the input matrix of elements to arrange the elements in a layout suited for efficient processing by a matrix processing component.

At 503, a first multiplication input matrix is multiplied with a second multiplication input matrix. In some embodiments, the multiplication is performed by matrix processing component 306 of FIG. 3. In various embodiments, the transposed input matrix of elements is utilized as the first multiplication input matrix. In some embodiments, a mask vector is utilized as the second multiplication input matrix. For example, the mask vector may be a vector of the same width as each row of the transposed input matrix and whose elements all have the value one. In some embodiments, the mask vector is broadcasted to all the rows of the transposed input matrix and a dot product is formed between each row of the transposed input matrix and the mask vector, resulting in a vector product in which each element is a sum of elements of a corresponding row in the transposed input matrix of elements (sum due to the dot product between a row of a matrix and a vector of ones resulting in a sum of the row in the matrix). In some embodiments, multiple instances of matrix processing components (e.g., multiple instances of matrix processing component 306 of FIG. 3) are utilized for parallel processing. For example, a 32×32 matrix of 32-bit integers may be transposed (e.g., by matrix transpose component 304 of FIG. 3) and resulting data may split up and sent to multiple (e.g., two, four, etc.) separate matrix processing components.

At 505, at least a portion of elements of a result matrix are modified. In some embodiments, the modification is performed by data alignment component 308 of FIG. 3. In some embodiments, the result matrix is the vector product resulting from the dot products between each row of the transposed input matrix and the broadcasted vector of ones. In some embodiments, at least some of the elements in the vector product are bit shifted (some elements may not require bit shifting). In various embodiments, the elements are bit shifted according to their bit positions relative to a higher-bit-width number. For example, sums of the 8 most significant bit portions of 32-bit numbers may bit shifted leftward by 24 bits, sums of the next 8 most significant bit portions may be bit shifted leftward 16 bits, sums of the next to last 8 least significant bit portions may be bit shifted leftward by 8 bits, and sums of the 8 least significant bit portions may be bit shifted 0 bits (no bit shift).

At 507, at least the elements of the modified result matrix are summed. In some embodiments, the summing is performed by data reduction component 310 of FIG. 3. In some embodiments, the modified result matrix is the bit-shifted version of the vector product resulting from the dot products between each row of the transposed input matrix and the broadcasted vector of ones. In various embodiments, the sum of the elements of the modified result matrix is the sum of the values stored in the input matrix of elements.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
a matrix transpose component configured to transpose an initial matrix of elements to output an output matrix of the elements that have been transposed, wherein:
each element of the initial matrix of elements is represented using a first number of bits;
each value of a group of values stored in an input matrix corresponding to the initial matrix is represented using a second number of bits greater than the first number of bits; and
each value of the group of values is stored as split segments across more than one element of the elements of the initial matrix;
a matrix processing component configured to multiply a first multiplication input matrix with a second multiplication input matrix, wherein the output matrix of the matrix transpose component is utilized as the first multiplication input matrix and a mask vector is utilized as the second multiplication input matrix;
a data alignment component configured to modify at least a portion of elements of a result of the matrix processing component; and
a data reduction component configured to sum at least the elements of the modified result of the matrix processing component to determine a sum of the group of values.

2. The device of claim 1, wherein the first number of bits is eight bits and the second number of bits is thirty-two bits.

3. The device of claim 1, wherein each value stored in the mask vector is a value of one as represented using the first number of bits.

4. The device of claim 1, wherein the result of the matrix processing component is a vector of dot product results.

5. The device of claim 4, wherein a dot product result of the vector of dot product results is a dot product of a row of the first multiplication input matrix with the mask vector.

6. The device of claim 1, wherein the data alignment component is configured to modify at least the portion of elements of the result of the matrix processing component including by being configured to bit shift an element of the result of the matrix processing component by a specified bit shift amount.

7. The device of claim 6, wherein the specified bit shift amount for the element of the result of the matrix processing component is based at least in part on corresponding split segment locations of elements of the input matrix.

8. The device of claim 6, wherein a number of distinct specified bit shift amounts is equal to a number of split segments utilized to store each value of the group of values.

9. The device of claim 6, wherein specified bit shift amounts is at least one of: twenty-four bits, sixteen bits, 8 bits, or 0 bits.

10. The device of claim 1, wherein the matrix processing component includes a plurality of dot product processing components.

11. The device of claim 10, wherein at least one dot product processing component of the plurality of dot product processing components includes a vector multiply unit and a vector adder unit.

12. The device of claim 1, wherein the data alignment component includes a plurality of bit shifters.

13. The device of claim 1, wherein the input matrix is utilized in an artificial neural network operation.

14. The device of claim 1, wherein the matrix transpose component is configured to transpose the initial matrix of elements including by being configured to copy elements of the initial matrix to buffer storage.

15. The device of claim 1, wherein the matrix transpose component is configured to transpose the initial matrix of elements including by being configured to move at least a portion of the elements of the initial matrix in a memory storing the elements of the initial matrix to a different location in the memory.

16. An integrated circuit device, comprising:
  a matrix transpose component configured to transpose an initial matrix of elements to output an output matrix of the elements that have been transposed, wherein:
    each element of the initial matrix of elements is represented using a first number of bits;
    each value of a group of values stored in an input matrix corresponding to the initial matrix is represented using a second number of bits greater than the first number of bits; and
    each value of the group of values is stored as split segments across more than one element of the elements of the initial matrix;
  a matrix processing component configured to multiply a first multiplication input matrix with a second multiplication input matrix, wherein the output matrix of the matrix transpose component is utilized as the first multiplication input matrix and a mask vector is utilized as the second multiplication input matrix;
  a data alignment component configured to modify at least a portion of elements of a result of the matrix processing component; and
  a data reduction component configured to sum at least the elements of the modified result of the matrix processing component to determine a sum of the group of values; and
  wherein the integrated circuit device is an application-specific integrated circuit.

17. A method, comprising:
  using a hardware matrix transpose component of an application-specific integrated circuit device to transpose an initial matrix of elements to output an output matrix of the elements that have been transposed, wherein:
    each element of the initial matrix of elements is represented using a first number of bits;
    each value of a group of values stored in an input matrix corresponding to the initial matrix is represented using a second number of bits greater than the first number of bits; and
    each value of the group of values is stored as split segments across more than one element of the elements of the initial matrix;
  using a hardware matrix processing component of the application-specific integrated circuit device to multiply a first multiplication input matrix with a second multiplication input matrix, wherein the output matrix of the elements that have been transposed is utilized as the first multiplication input matrix and a mask vector is utilized as the second multiplication input matrix;
  using a hardware data alignment component of the application-specific integrated circuit device to modify at least a portion of elements of a result of multiplying the first multiplication matrix with the second multiplication matrix; and
  using a hardware data reduction component of the application-specific integrated circuit device to sum at least the elements of the modified result of multiplying the first multiplication matrix with the second multiplication matrix to determine a sum of the group of values.

18. The method of claim 17, wherein the first number of bits is eight bits and the second number of bits is thirty-two bits.

19. The method of claim 17, wherein each value stored in the mask vector is a value of one as represented using the first number of bits.

20. The method of claim 17, wherein the result of multiplying the first multiplication matrix with the second multiplication matrix is a vector of dot product results.

* * * * *